US010733519B2

(12) United States Patent
    Dureau

(10) Patent No.: US 10,733,519 B2
(45) Date of Patent: *Aug. 4, 2020

(54) SYSTEMS AND METHODS FOR DETERMINING THAT A MEDIA ITEM IS BEING PRESENTED

(71) Applicant: GOOGLE LLC, Mountain View, CA (US)

(72) Inventor: Vincent Dureau, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 15/659,126

(22) Filed: Jul. 25, 2017

(65) Prior Publication Data

US 2017/0323214 A1    Nov. 9, 2017

Related U.S. Application Data

(63) Continuation of application No. 14/241,394, filed as application No. PCT/US2012/052372 on Aug. 24, 2012, now Pat. No. 9,715,659.

(Continued)

(51) Int. Cl.
    *G06N 5/04*       (2006.01)
    *H04N 21/436*     (2011.01)
    (Continued)

(52) U.S. Cl.
    CPC ......... *G06N 5/048* (2013.01); *H04N 21/4394* (2013.01); *H04N 21/43615* (2013.01);
    (Continued)

(58) Field of Classification Search
    CPC combination set(s) only.
    See application file for complete search history.

(56) References Cited

U.S. PATENT DOCUMENTS 7,231,419 B1    6/2007  Gheorghe et al.
7,487,072 B2    2/2009  Semple et al.
                (Continued)

FOREIGN PATENT DOCUMENTS

CN          101657809         2/2010
WO     WO 2002/062009 A1      8/2002
                (Continued)

OTHER PUBLICATIONS

Adomavicius, Toward the Next Generation of Recommender Systems: A Survey of the State-of-the-Art and Possible Extensions, IEEE Transactions on Knowledge and Data Engineering, Los Alamitos, CA, vol. 17, No. 6, Jun. 1, 2005, 16 pgs.
(Continued)

*Primary Examiner* — Michael B Holmes
(74) *Attorney, Agent, or Firm* — Morgan, Lewis & Bockius LLP

(57) ABSTRACT

The various implementations described herein include systems and methods for determining that media items are currently being presented. In one aspect, a method performed at a client device includes: (1) identifying a media item potentially being presented on an output device coupled to the client device; (2) calculating a level of confidence that the identified media item is currently being presented to the user; (3) subsequent to the calculating, determining that at least one predetermined event associated with user interaction with the media item has occurred; and (4) based on the at least one predetermined event, increasing or decreasing the level of confidence that the identified media item is currently being presented to the user.

20 Claims, 9 Drawing Sheets

Related U.S. Application Data

(60) Provisional application No. 61/528,105, filed on Aug. 26, 2011.

(51) Int. Cl.
| | |
|---|---|
| *H04N 21/439* | (2011.01) |
| *H04N 21/44* | (2011.01) |
| *H04N 21/442* | (2011.01) |
| *H04N 21/466* | (2011.01) |
| *H04N 21/4782* | (2011.01) |
| *H04N 21/8358* | (2011.01) |
| *H04N 21/84* | (2011.01) |
| *H04N 21/443* | (2011.01) |

(52) U.S. Cl.
CPC . *H04N 21/44008* (2013.01); *H04N 21/44222* (2013.01); *H04N 21/4667* (2013.01); *H04N 21/4782* (2013.01); *H04N 21/8358* (2013.01); *H04N 21/84* (2013.01); *H04N 21/4431* (2013.01); *H04N 21/4668* (2013.01)

(56) References Cited

U.S. PATENT DOCUMENTS

| | | | |
|---|---|---|---|
| 8,271,334 B1 | 9/2012 | Funk et al. | |
| 8,275,328 B2 | 9/2012 | Kim et al. | |
| 8,375,328 B2 | 2/2013 | Koh et al. | |
| 8,583,489 B2 | 11/2013 | Funk et al. | |
| 8,775,415 B2 | 7/2014 | Jeon et al. | |
| 8,954,955 B2 | 2/2015 | Dureau et al. | |
| 8,984,186 B2 | 3/2015 | Dureau | |
| 8,989,718 B2 * | 3/2015 | Ramer | G06Q 30/02 |
| | | | 455/414.4 |
| 9,088,809 B2 | 7/2015 | Jeon et al. | |
| 9,148,238 B2 | 9/2015 | Dureau | |
| 9,363,310 B2 | 6/2016 | Dureau et al. | |
| 9,380,333 B2 | 6/2016 | Dureau et al. | |
| 9,386,264 B2 | 7/2016 | Dureau | |
| 9,866,899 B2 * | 1/2018 | Dureau | H04N 5/50 |
| 9,876,741 B1 * | 1/2018 | Taboriskiy | H04L 51/046 |
| 9,942,600 B2 * | 4/2018 | Dureau | H04N 21/4622 |
| 10,103,899 B2 * | 10/2018 | Dureau | H04N 21/43635 |
| 10,110,608 B2 * | 10/2018 | Dureau | H04L 63/101 |
| 10,121,334 B2 * | 11/2018 | Dureau | H04N 21/44218 |
| 10,178,438 B2 * | 1/2019 | Dureau | H04N 21/4622 |
| 10,194,201 B2 * | 1/2019 | Dureau | H04N 5/50 |
| 10,231,022 B2 * | 3/2019 | Dureau | H04N 21/43615 |
| 10,271,108 B2 * | 4/2019 | Dureau | H04H 60/72 |
| 10,289,275 B2 * | 5/2019 | Dureau | H04L 67/10 |
| 10,375,449 B2 * | 8/2019 | Fisher | H04N 21/43615 |
| 10,403,101 B2 * | 9/2019 | Dureau | H04N 5/64 |
| 2006/0277176 A1 | 12/2006 | Liao | |
| 2007/0006026 A1 | 1/2007 | Roychowdhary et al. | |
| 2007/0244903 A1 * | 10/2007 | Ratliff | G06F 16/48 |
| 2008/0098432 A1 | 4/2008 | Hardacker et al. | |
| 2008/0270154 A1 * | 10/2008 | Klots | G06Q 30/02 |
| | | | 705/14.4 |
| 2011/0206342 A1 | 8/2011 | Thompson et al. | |
| 2012/0124125 A1 | 5/2012 | Smith et al. | |
| 2012/0205436 A1 * | 8/2012 | Thomas | G06K 17/0025 |
| | | | 235/375 |
| 2012/0311623 A1 * | 12/2012 | Davis | H04N 5/765 |
| | | | 725/18 |

FOREIGN PATENT DOCUMENTS

| | | |
|---|---|---|
| WO | WO 2008/042280 A2 | 4/2008 |
| WO | WO 2010/144671 A2 | 12/2010 |

OTHER PUBLICATIONS

Google Inc., International Preliminary Report on Patentability, PCT/US2012/052372, dated Mar. 13, 2014, 9 pgs.

Google Inc., International Search Report and Written Opinion, PCT/US2012/052372, dated Feb. 25, 2013, 11 pgs.

Google Inc., Supplementary European Search Report, EP 12827907.2, dated Apr. 8, 2015, 9 pgs.

Google, First Office Action, CN 201280052149.3, dated Sep. 28, 2016, 12 pgs.

Joint Quantization and Confidence-Based Generalized Combining Scheme for Cooperative Spectrum Sensing Waleed Ejaz; Ghaith Hattab; Takwa Attia; Mohamed Ibnkahla; Fatma Abdelkefi; Mohamed Siala IEEE Systems Journal Year: 2016, vol. PP, Issue: 99 pp. 1-12, DOI: 10.1109/JSYST.2016.2615019 IEEE Early Access Articles.

Modelling the confidence of timing analysis for time randomised caches Pedro Benedicte; Leonidas Kosmidis;Eduardo Quinones; Jaume Abella; Francisco J. Cazorla 2016 11th IEEE Symposium on Industrial Embedded Systems (SIES) Year: 2016 pp. 1-8, DOI: 10.1109/SIES.2016.7509421 IEEE Conference Publications.

Event Access Expressions: A Business User Language for Analyzing Event Streams Szabolcs Rozsnyai; Hannes Obweger; Josef Schiefer 2011 IEEE International Conference on Advanced Information Networking and Applications Year: 2011 pp. 191-199, DOI: 10.1109/AINA.2011.88 IEEE Conference Publications.

Towards a Context-Aware and Adaptable Room System for Intelligent "Trusted" Office-Spaces in Smart Cities Tim French; Nik Bessis 2012 Sixth International Conference on Innovative Mobile and Internet Services in Ubiquitous Computing Year: 2012 pp. 148-154, DOI: 10.1109/IMIS.2012.62 IEEE Conference Publications.

Google, Original Patent Certificate for Invention, Patent No. ZL251280052149.3, Dec. 26, 2017, 1 pg.

* cited by examiner

SYSTEMS AND METHODS FOR DETERMINING THAT A MEDIA ITEM IS BEING PRESENTED

RELATED APPLICATIONS

This application is a continuation of U.S. application Ser. No. 14/241,394, filed Sep. 8, 2014, entitled "System and Method for Determining a Level of Confidence that a Media Item is being Presented," (now U.S. Pat. No. 9,715,659), issued Jul. 25, 2017 which is a United States National State Application filed under 35 U.S.C. § 371 of PCT Patent Application Serial No. PCT/US2012/052372, filed on Aug. 24, 2012, which claims priority to U.S. Provisional Patent Application No. 61/528,105, filed 26 Aug. 2011, entitled "System and Method for Determining a Level of Confidence that a Media Item is Being Presented," each of which is hereby incorporated by reference in its entirety.

TECHNICAL FIELD

The disclosed embodiments relate generally to determining a level of confidence that an identified media item is currently being presented to a user.

BACKGROUND

Tracking the media items that a user accesses (e.g., views, listens) allows content providers and/or third party service providers to provide personalized recommendations for media items in which the user may be interested and/or targeted advertisements for products and/or services for which the user may be interested. However, an intermediary device that provides enhanced multimedia functionality to another media device may not know with certainty which media items the user has accessed.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DESCRIPTION OF EXAMPLE EMBODIMENTS

The description that follows includes example systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for determining a level of confidence that an identified media item is currently being presented to a user.

System Architecture

Figure 1:
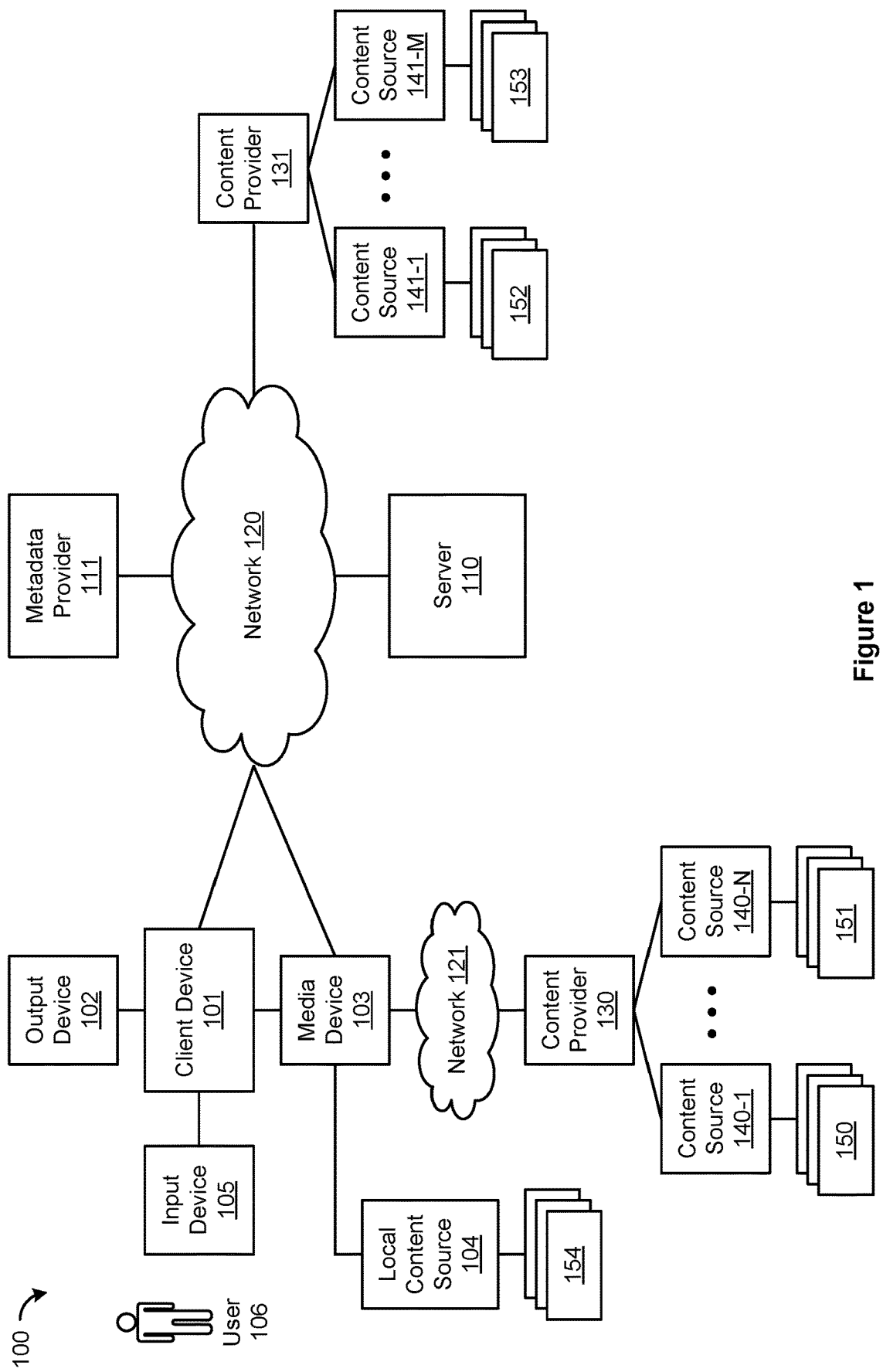
FIG. 1 is a block diagram illustrating an example network system, according to some embodiments.

FIG. 1 is a block diagram illustrating an example network system 100, according to some embodiments. The network system 100 includes a client device 101 coupled to an output device 102, a media device 103, and an input device 105 of a user 106. In some implementations, the client device 101 is a television set top box. In some embodiments, the output device 102 includes one or more of a monitor, a projector, a television, and a speaker.

In some implementations, the client device 101 is an intermediary device that is configured to control devices coupled to the client device 101 (e.g., the media device 103, the output device 102, etc.) and that is configured to provide enhanced multimedia functionality. The enhanced multimedia functionality includes, but is not limited to, providing picture-in-picture capabilities on the output device 102 that allows the user 106 to simultaneously access (e.g., browse and/or otherwise interact with) web sites on the output device 102 (e.g., a television display) while watching and/or listening to an instance of a media item (e.g., a video) being presented in a smaller area of the output device 102, providing a user interface on the output device 102 that allows the user 106 to search for instances of media items that are available on content sources (e.g., a particular television channel, a streaming media service, etc.) that are accessible to the client device 101 of the user 106, and modifying audio and/or video signals received from the media device 103 (e.g., overlaying graphical objects in video stream, inserting audio into an audio stream, etc.) and outputting the modified audio and/or video signals to the output device 102 for presentation to the user 106.

Note that an "instance of a media item" may refer to a particular showing of the media item at a particular date and/or time on a particular content source (e.g., a showing of Episode 1 of the Simpsons at 10 PM on Jan. 3, 2011, on Channel 2 of an over-the-air television service, etc.) or a particular copy of the media item on a particular content source (e.g., Episode 1 of the Simpsons on streaming video service 1 for rent, Episode 1 of the Simpsons on streaming video service 2 for purchase, etc.).

A media item includes, but is not limited to, a movie, a video, a television program (e.g., an episode of a television series, a standalone television program, etc.), a book, an issue of a magazine, an article, a song, and a game.

A content source includes, but is not limited to, a digital video recorder, a satellite radio channel, a over-the-air radio channel, a over-the-air television channel, a satellite television channel, a cable television channel, a cable music channel, an Internet Protocol television channel, and a streaming media service (e.g., a video-on-demand service, a streaming video service, a streaming music service, etc.).

In some implementations, the user 106 uses the input device 105 to instruct the client device 101 to perform various actions with respect to the output device 102 and/or the media device 103. For example, the user 106 may use the input device 105 to instruct the client device 101 to increase the volume of the output device 102. Similarly, the user 106 may use the input device 105 to instruct the client device 101 to instruct the media device 103 to obtain instances of media items. Furthermore, the user 106 may use the input device 105 to instruct the client device 101 to search for instances of media items satisfying a search query. The interactions between the user 106, the client device 101, the output device 102, and the media device 103 are described in more detail with reference to FIGS. 3 and 4.

The input device 105 includes, but is not limited to, a pointing device (e.g., a mouse, a trackpad, a touchpad, a free space pointing device), a keyboard, a touch-sensitive display device (e.g., a touch-screen display and/or controller), a remote controller, a smart phone including a remote controller application, and a visual gesture recognition system (e.g., a system that captures and recognizes motions and/or gestures of a user and translates the motions and/or gestures into input commands).

In some embodiments, the media device 103 is configured to obtain instances of media items from a content source and provide audio and/or video signals to be presented to the user 106 using the output device 102.

In some embodiments, the media device 103 obtains instances of media items (e.g., instances of media items 154) from a local content source 104. In some implementations, the local content source 104 includes one or more of a digital video recorder of the media device 103, a hard disk drive of the media device 103, and a network storage device accessible by the media device 103.

In some embodiments, the media device 103 obtains instances of media items (e.g., instances of media items 150 and 151) from content sources 140 provided by a content provider 130 via network 121. A "content provider" is an entity or a service that provides one or more content sources and a "content source" is a source of instances of media items (e.g., a television channel, a radio channel, a web site, a streaming media service, etc.). In some implementations, network 121 includes one or more of a cable television service, a satellite television service, a satellite radio service, an over-the-air television service, an over-the-air radio service, and a data network (e.g., network 120, the Internet, a virtual private network, etc.).

In some embodiments, the media device 103 obtains instances of media items (e.g., instances of media items 152 and 153) from content sources 141 provided by a content provider 131 via network 120. In some implementations, the content provider 131 is a streaming media service (e.g., a streaming video service, a streaming audio service, etc.). Network 120 can generally include any type of wired or wireless communication channel capable of coupling together computing nodes. This includes, but is not limited to, a local area network, a wide area network, or a combination of networks. In some embodiments, network 120 includes the Internet.

In general, the media device 103 may obtain instances of media items from any combination of: local content sources, content sources available via network 121, and content sources available via network 120.

In some embodiments, the media device 103 includes a physical device. The physical device includes, but is not limited to, a digital video recorder, a satellite radio set top box, an over-the-air radio tuner, an over-the-air television tuner, a satellite television set top box, a cable television set top box, an Internet Protocol television set top box, and a game console.

In some embodiments, the media device 103 includes a virtual device (e.g., a software module) executing on the client device 101. The virtual device includes, but is not limited to, a web browser executing on the client device 101 and a streaming media application executing on the client device 101.

In general, the media device 103 may include any combination of physical devices and virtual devices.

In some embodiments, the network system 100 includes a server 110 coupled to network 120. In these embodiments, the server 110 obtains metadata for instances of media items from a metadata provider 111 and/or from web sites on the Internet, builds a database of media items based on the metadata for the instances of the media items, and returns information relating to instances of media items satisfying search queries and that are available on content sources accessible to the client device 101. A content source that is accessible to the client device 101 (of a user 106) includes a content source for which the client device 101 has a subscription (e.g., a cable or satellite television channel, a streaming media service, etc.) a content source for which the client device 101 has an appropriate media device to receive media items from the content source (e.g., an over-the-air television or radio tuner, a network interface device, an application for a streaming media service, etc.), and a content source for which the client device 101 has purchased rights to obtain media items (e.g., a video-on-demand service, a video rental service, etc.). Note that the client device 101 may only be able to access a particular set of content sources. For example, the client device 101 may only have access to particular channels on a cable television service. Similarly, the client device 101 may have access to a first streaming media service, but not a second streaming media service. Thus, it is beneficial to provide the user 106 only with information for instances of media items that are available on content sources accessible to the client device 101.

The metadata for an instances of a media item include, but are not limited to, a content source on which the instance of the media item is available, dates and times when the instance of the media item is available, actors associated with the instance of the media item, musicians associated with the instance of the media item, producers associated with the instance of the media item, directors associated with the instance of the media item, a synopsis of the instance of the media item, a first air date of the instance of the media item, a series for which the instance of the media item is a member (e.g., a television series, etc.), a genre (e.g., comedy, drama, game show, horror, suspense, reality, etc.) of the instance of the media item, and a cost of the instance of the media item.

The information relating to an instance of the media item include, but are not limited to, at least a subset of the metadata for the instance of the media item, links to content relating to the media item (e.g., a link to an a web page of an actor appearing in the media item, etc.), and content relating to the media item that is obtained from another database (e.g., a proprietary database) and/or from web pages including content related to the media item (e.g., a web page for a television program, a web page for an actor, etc.).

In some implementations, previously queries and search results are stored in a cache to speed up query responses. The previous queries and search results may be periodically removed from the cache to ensure that the cache is not storing search results for instances of media items that are no longer available (e.g., a show time of an episode of a television series may have passed since information relating to the instance of the episode was stored in the cache).

The server 110 is described in more detail below with reference to FIG. 2.

Note that although FIG. 1 illustrates that the client device 101 is coupled to one media device (e.g., the media device 103), one output device (e.g., the output device 102), and one input device (e.g., the input device 105), the client device 101 may be coupled to multiple media devices, multiple output devices, and multiple input devices. Similarly, although FIG. 1 illustrates one client device (e.g., the client device 101) and one metadata provider (e.g., metadata provider 111), the network system 100 may include multiple client devices and metadata providers. Moreover, although FIG. 1 illustrates one content provider (e.g., the content provider 130) coupled to network 121 and one content provider (e.g., the content provider 131) coupled to network 120, multiple content providers may be coupled to each network.

Furthermore, although FIG. 1 shows one instance of the server 110, multiple servers may be present in the network system 100. For example, the server 110 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

The client device 101 is described in more detail below with reference to FIGS. 3, 4, and 6. The server 110 is described in more detail below with reference to FIGS. 2 and 5.

Figure 2:
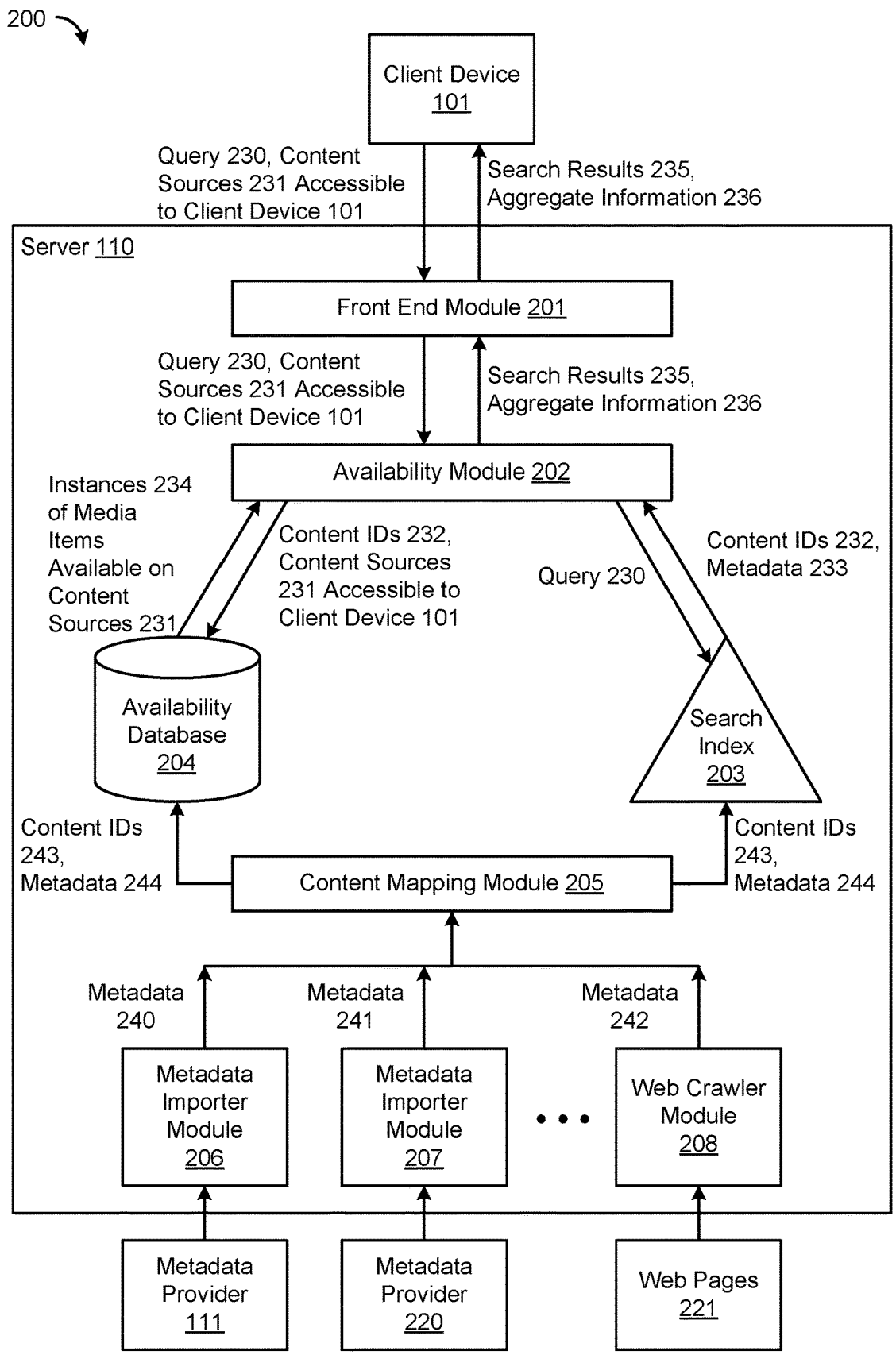
FIG. 2 is a block diagram illustrating example modules of a server, according to some embodiments.

FIG. 2 is a block diagram illustrating example modules of the server 110, according to some embodiments. The server 110 includes a front end module 201, an availability module 202, a content mapping module 205, metadata importer modules 206-207, and a web crawler module 208. The front end module 201 provides an interface between the modules of server 110 and the client device 101. The availability module 202 identifies instances of media items that satisfy a search query received from the client device 101 and that are available on content sources that are accessible to the client device 101. As discussed above, the client device 101 may be only able to access a particular set of content sources. Thus, it is beneficial to provide the user 106 only with information for instances of media items that are available on content sources accessible to the client device 101. The content mapping module 205 processes metadata obtained by the metadata importer modules 206-207 and the web crawler module 208 to generate a search index 203 and an availability database 204.

The following discussion illustrates an example process for importing metadata for instances of media items. The metadata importer modules 206-207 obtain metadata 240 and 241 for instances of media items from metadata providers 111 and 220, respectively. In some implementations, the server 110 includes a metadata importer module for each metadata provider. The web crawler module 208 imports and processes web pages 221 to produce metadata 242 for instances of media items. The metadata 240, 241 and 242 may include duplicate information. For example, the metadata provider 111 and the metadata provider 220 may both provide metadata for instances of media items available from a particular cable television service. However, each metadata provider may use different identifiers for the instances of the media items available from the particular cable television service. Thus, in some embodiments, the content mapping module 205 analyzes the metadata 240, 241, and 242 for the instances of the media items to identify unique media items. For example, the content mapping module 205 identify unique media items by grouping instances of media items for which a predetermined subset of the metadata for the instances of the media items match (e.g., a group of instances of media items is formed when the series name, the episode number, and the actors match for each of the instances of the media items in the group, etc.). The content mapping module 205 then generates content identifiers 243 for each unique media item and generates metadata 244 for the unique media items. In some embodiments, a content identifier includes an identifier for a series of related media items (e.g., a content identifier for a television series) and an identifier for a media item (e.g., a content identifier for an episode of the television series). The metadata 244 for a unique media item includes, but is not limited to, the content identifier 243 for the unique media item, at least a subset of the metadata 240, 241, and 242 for each instance of the unique media item. For example, Episode 1 of "The Simpsons" may have 6 instances across various content sources. The content mapping module 205 may assign a content identifier 243 having a value of "1" to Episode 1 of "The Simpsons" and may include metadata for each instance of Episode 1 of "The Simpsons." The content mapping module 205 uses the content identifiers 243 and the metadata 244 for the instances of the unique media items to generates a search index 203 that is used to efficiently identify content identifiers 243 for media items. The content mapping module 205 also uses the content identifiers 243 and the metadata 244 for the instances of the unique media items to generate an availability database 204 that is indexed by the content identifiers 243 and content sources on which the corresponding instances of the media items are available.

The following discussion illustrates an example process for responding to a search query from the client device 101. The front end module 201 receives a search query 230 from the client device 101 and dispatches the search query 230 to the availability module 202. Prior to dispatching the search query 230 to the availability module 202, the front end module 201 optionally normalizes and expands the search query 230. The front end module 201 optionally receives information relating to content sources 231 accessible to the client device 101 from the client device 101. Alternatively, the availability module 202 obtains the information relating to content sources 231 accessible to the client device 101 from a database (e.g., a profile of the user 106 of the client device 101, a profile for the client device 101, etc.). The availability module 202 queries the search index 203 using the search query 230 to obtain content identifiers 232 and metadata 233 for instances of media items that satisfy the search query 230. The availability module 202 then queries the availability database 204 using the content identifiers 232 and content sources 231 accessible to the client device 101 to obtain instances 234 of media items that are available on content sources 231 accessible to the client device 101. In other words, the instances 234 of media items are both (1) available on content sources 231 accessible to the client device 101 and (2) satisfy the search query 230.

The availability module 202 then generates search results 235 and aggregate information 236 based on the metadata 233 and the instances 234 of media items that are available on content sources 231 accessible to the client device 101. In some implementations the search results 235 include information relating to the instances 234 of media items (e.g., a name and/or an episode number for episodes of a television series, a name of a television series, a name of movie, etc.) and the aggregate information 236 corresponding to the unique media items. The aggregate information 236 of a media item includes, but is not limited to, a number of episodes of a series that are available on content sources 231 accessible to the client device 101, a most recent instance of the media item that is available on content sources 231 accessible to the client device 101 (e.g., an upcoming new episode, a newest episode that was previously aired, etc.), an oldest instance of the media item that is available on content sources 231 accessible to the client device 101 (e.g., a pilot episode, etc.), a completeness of the instances of the media item that are available on content sources 231 accessible to the client device 101 (e.g., all episodes are available), a number of unique content sources 231 on which the instances of the media item is accessible to the client device 101, a content source 231 that is most frequently selected, time periods during which the media item is available on the content sources 231, a future time at which the media item will available on the content sources 231, a remaining time that the media item is accessible on the content source 231, a date when the media item was purchased.

The availability module 202 then returns the search results 235 and/or the aggregate information 236 to the client device 101 via the front end module 201.

In some embodiments, the modules of the server 110 are included in the client device 101 to facilitate searching of media items stored in the local content source 104.

Figure 3:
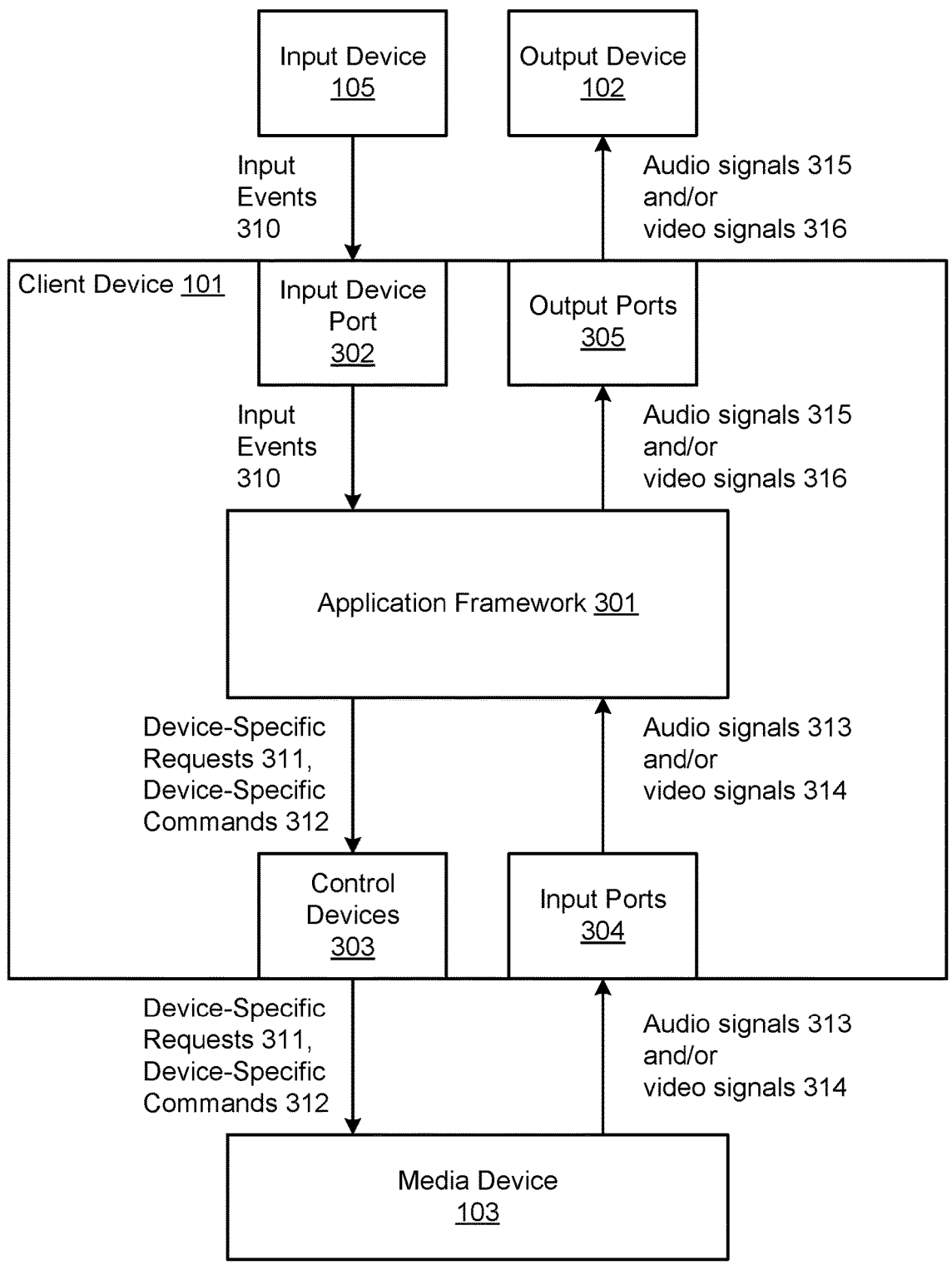
FIG. 3 is a block diagram illustrating example modules of a client device, according to some embodiments.

FIG. 3 is a block diagram illustrating example modules of the client device 101, according to some embodiments. In some implementations the client device 101 includes an application framework 301 that control devices 303 coupled to the client device 101 (e.g., the media device 103, the output device 102, etc.) in response to input events received from the input device 105 and that is configured to provide enhanced multimedia functionality (e.g., as described above with reference to FIG. 1). The application framework 301 is described in more detail below with reference to FIG. 4.

In some implementations, the client device 101 includes an input device port 302, control devices 303, input ports 304, and output ports 305. The input device port 302 receives input events from the input device 105. The control devices 303 transmit device-specific requests and/or device-specific commands to the media device 103 and/or the output device 102. In some implementations, the control devices 303 include one or more of an infrared transceiver, a serial interface device, a Bluetooth transceiver, and a network interface device. The input ports 304 receive audio signals and/or video signals from the media device 103. The output ports 305 transmit audio signals and/or video signals to the output device 102. In some implementations the input ports 304 and the output ports 305 include one or more of a universal serial bus (USB) port, a Bluetooth transceiver, an Ethernet port, a Wi-Fi transceiver, an HDMI port, a DisplayPort port, a Thunderbolt port, a composite video port, a component video port, an optical port, and an RCA audio port.

In some implementations the output device 102 is integrated with the client device 101. For example, the client device 101 and the output device 102 may be included in the same housing (e.g., a television set).

The following discussion illustrates an example process for processing requests and/or commands received from the input device 105. The application framework 301 receives input events 310 from the input device 105 via the input device port 302. The input events 310 include, but are not limited to, key presses, pointer positions, pointing device button presses, scroll wheel positions, gestures, and selections of graphical user interface (GUI) objects (e.g., links, images, etc.).

One or more of the input events 310 may correspond to a device-agnostic request and/or a device-agnostic command. A device-agnostic request (e.g., a request to acquire a media device, a request to obtain instances of media items, etc.) is a generic request that may be issued to a plurality of devices regardless of the device-specific syntax of requests for the plurality of particular devices. Similarly, a device-agnostic command (e.g., a command to increase a volume level, a command to change a channel, etc.) is a generic command that may be issued to a plurality of devices regardless of the device-specific syntax of requests for the plurality of particular devices.

The application framework 301 maps device-agnostic requests to device-specific requests 311 for the media device 103. Similarly, the application framework 301 maps device-agnostic commands to device-specific commands 312 for the media device 103. The application framework transmits the device-specific requests 311 and/or the device-specific commands 312 to the media device 103 using the control devices 303.

In response to the device-specific requests 311 and/or the device-specific commands 312, the media device 103 transmits audio signals 313 and/or video signals 314 that the application framework 301 receives via the input ports 304.

The application framework 301 then generates audio signals 315 and/or video signals 316 using the audio signals 313 and/or video signals 314 to provide enhanced multimedia functionality (e.g., overlaying a GUI on the video signals 314, overlaying audio on the audio signals 313).

The application framework 301 then transmits the audio signals 315 and/or the video signals 316 to the output device 102 using the output ports 305.

In some implementations, the application framework 301 facilitates web searches and/or web browsing through a GUI that is displayed on the output device 102.

Figure 4:
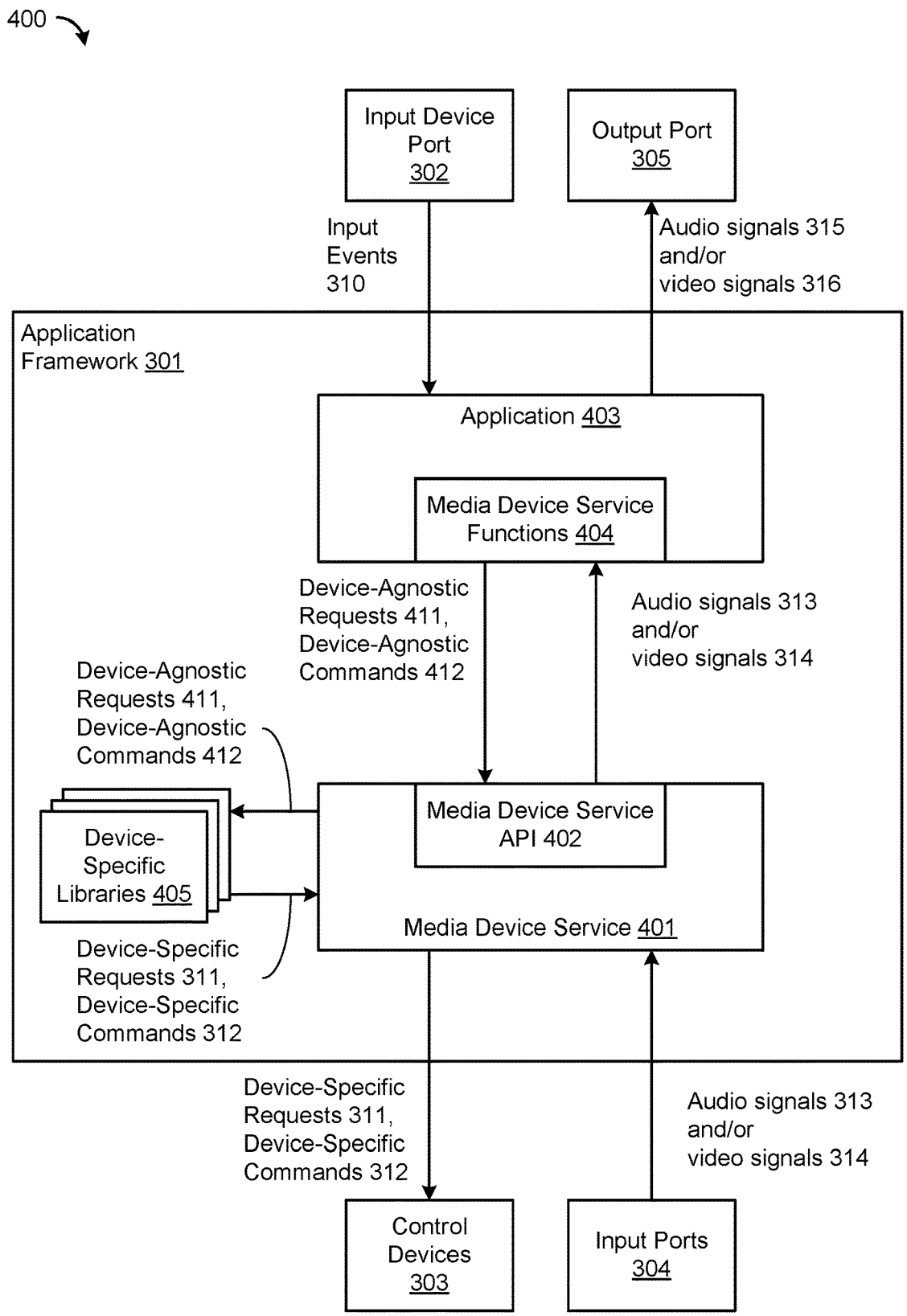
FIG. 4 is a block diagram illustrating example modules of an application framework, according to some embodiments.

FIG. 4 is a block diagram illustrating example modules of the application framework 301, according to some embodiments. The application framework 301 includes a media device service 401 executing in the application framework 301, a media device service application programming interface (API) 402, an application 403 executing in the application framework 301, and media device libraries 405. The media device service 401 provides an abstract interface between the application 403, the media devices, and the output devices so that application developers can develop applications for the client device 101 without having to know the details (e.g., device-specific syntax, device-specific protocols, device-specific APIs, etc.) of particular media devices and/or particular output devices that are coupled to the client device 101. Furthermore, the media device service 401 hides the complexity of the asynchronous actions that occur between the client device 101, the output device 102, and the media device 103 by maintaining state transitions and monitoring the progress of these asynchronous actions. The media device libraries 405 provide mappings between device-agnostic requests and device-agnostic command received from the application 403 executing in the application framework 301 to device-specific requests and device-specific commands, respectively, for a target media device. These mappings allow application developers to call media device service functions 404 of the media device service API 402 to make requests to media devices (e.g., making device-agnostic requests to media devices) and/or to issue commands to media devices (e.g., issuing device-agnostic commands to media devices) without having to know beforehand which particular media devices a user is using or to which the user has access.

The following discussion illustrates an example process for processing requests and/or commands received from the input device 105. The application 403 receives the input events 310 and interprets the input events 310 requests and/or commands. The application 403 calls the media device service functions 404 of the media device service API 402 to issue device-agnostic request 411 and/or device-agnostic commands 412 to the media device service 401. The media device service 401 uses a media device library 405 for a target media device of device-agnostic request 411 and/or device-agnostic commands 412 to map the device-agnostic requests 411 and/or the device-agnostic commands 412 to the corresponding device-specific requests 311 and/or the corresponding device-specific commands 312, respectively. The media device service 401 then issues the device-specific requests 311 and/or the device-specific commands 312 to the control devices 303.

The media device service 401 provides the audio signals 313 and/or the video signals 314 to the application 403. The application 403 may enhance the audio signals 313 and/or the video signals 314 to produce the audio signals 315 and/or the video signals 316.

Figure 5:
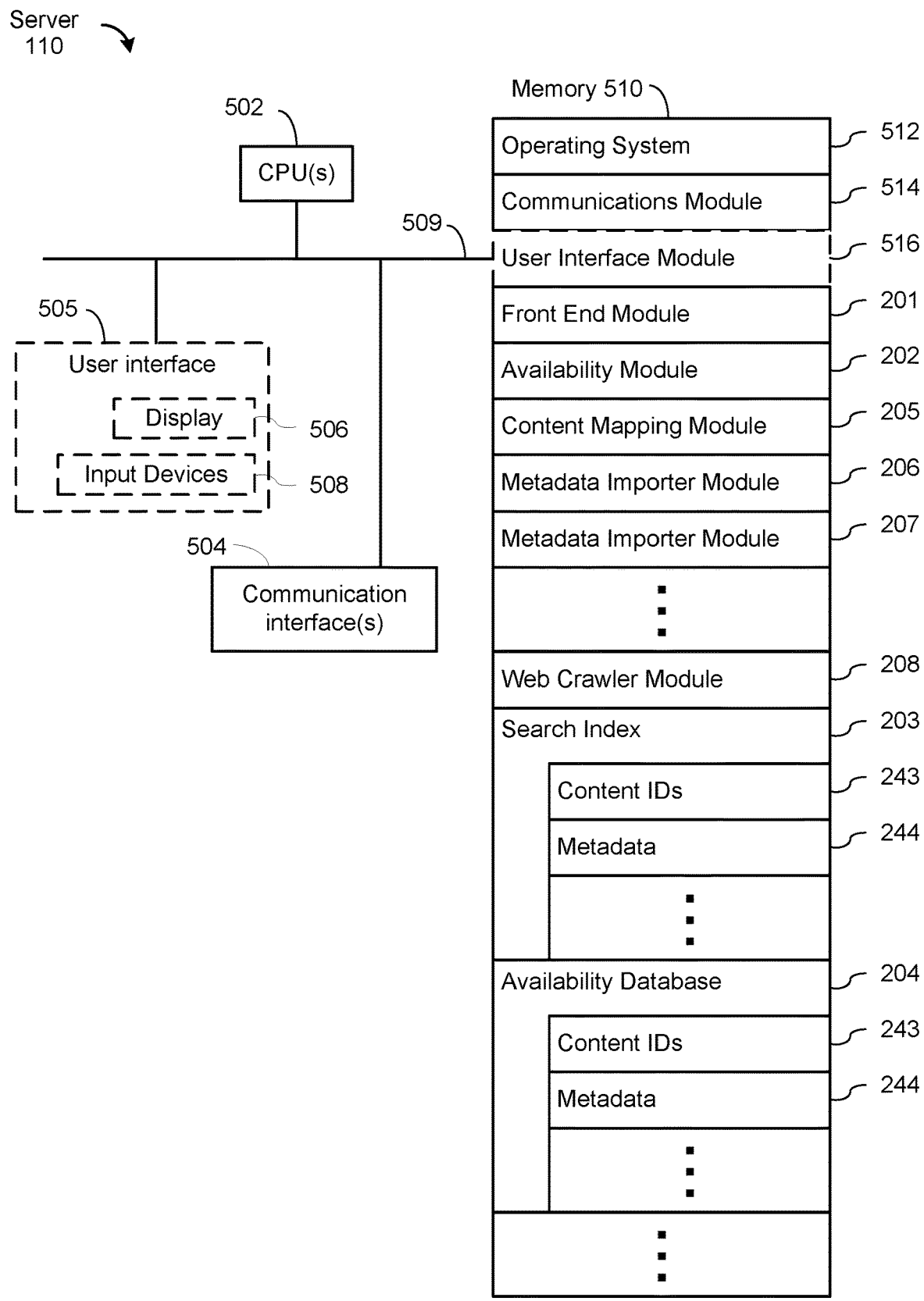
FIG. 5 is a block diagram illustrating an example server, according to some embodiments.

FIG. 5 is a block diagram illustrating the server 110, according to some embodiments. The server 110 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The server 110 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:

- an operating system 512 that includes procedures for handling various basic system services and for performing hardware dependent tasks;
- a communication module 514 that is used for connecting the server 110 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;
- the front end module 201, as described herein;
- the availability module 202, as described herein;
- the content mapping module 205, as described herein;
- the metadata importer modules 206-207, as described herein;
- the web crawler module 208, as described herein;
- the search index 203 including the content identifiers 243 and the metadata 244 for instances of media items, as described herein; and
- the availability database 204 including the content identifiers 243 and the metadata 244 for instances of media items, as described herein.

In some embodiments, the programs or modules identified above correspond to sets instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a "server," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the server 110 and how features are allocated among them will vary from one implementation to another, and may depend in part on the amount of data traffic that the system must handle during peak usage periods as well as during average usage periods.

Figure 6:
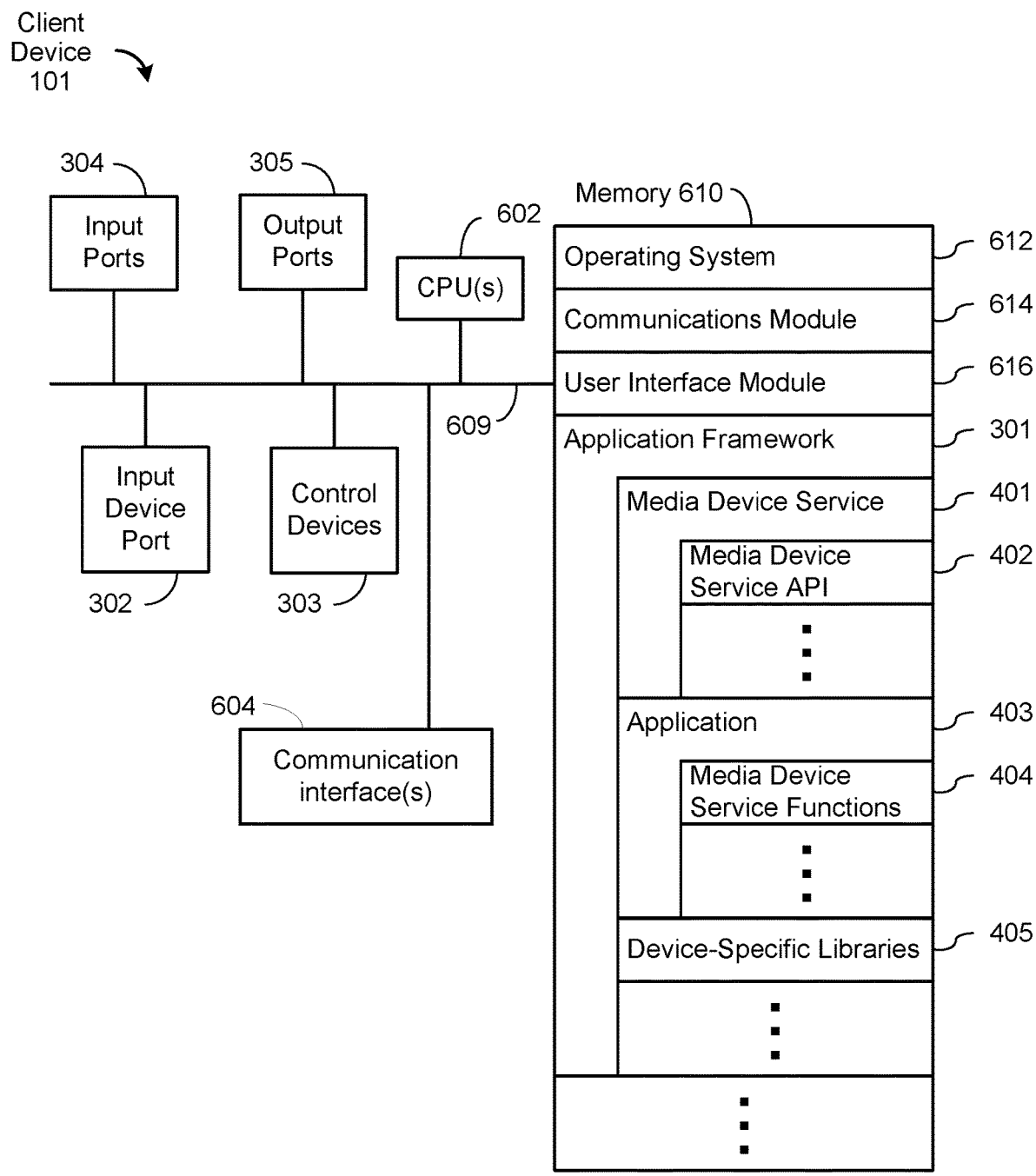
FIG. 6 is a block diagram illustrating an example client device, according to some embodiments.

FIG. 6 is a block diagram illustrating the client device 101, according to some embodiments. The client device 101 typically includes one or more processing units (CPU's, sometimes called processors) 602 for executing programs (e.g., programs stored in memory 610), one or more network or other communications interfaces 604, memory 610, the input device port 302, the control devices 303, the input ports 304, the output ports 305, and one or more communication buses 609 for interconnecting these components. The communication buses 609 may include circuitry (sometimes called a chipset) that interconnects and controls communications between system components. Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:

- an operating system 612 that includes procedures for handling various basic system services and for performing hardware dependent tasks;
- a communication module 614 that is used for connecting the client device 101 to other computers via the one or more communication interfaces 604 (wired or wireless) and one or more communication networks, such as the Internet, other wide area networks, local area networks, metropolitan area networks, and so on;
- a user interface module 616 that receives commands from the user via the input devices 608 and generates user interface objects in a display device (e.g., the output device 102); and
- the application framework 301 including the media device service 401 itself including the media device service API 402, the application 403 itself including the media device service functions 404, and the media device libraries 405, as described herein.

In some embodiments, the programs or modules identified above correspond to sets instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various embodiments. In some embodiments, memory 610 stores a subset of the modules and data structures identified above. Furthermore, memory 610 may store additional modules and data structures not described above.

Although FIG. 6 shows a "client device," FIG. 6 is intended more as functional description of the various features which may be present in a client device than as a structural schematic of the embodiments described herein. In practice, and as recognized by those of ordinary skill in the art, items shown separately could be combined and some items could be separated.

Determining a Level of Confidence that an Identified Media Item is Being Presented As discussed above, an intermediary device such as the client device 101 may not know with certainty that the user 106 has accessed particular media items. If the user 106 uses the input device 105 to control the client device 101, the client device 101 knows with a high level of confidence that the user 106 is accessing a particular media item because the client device 101 knows the requests and/or commands that are made by the user 106. However, the user 106 may use a controller for the media device 103 and/or use controls located on the media device 103 to control the media device 103. Accordingly, the client device 101 may not know whether the user 106 is still accessing (e.g., viewing, listening to, etc.) the particular media item or whether the user 106 has accessed another media item. In some embodiments, the client device 101 use data relating to the media item currently being presented to the user 106 (and/or historical data relating to media items previously presented to the user 106) and a level of confidence that the media item is currently being presented to the user 106 to provide personalized recommendations for media items in which the user 106 may be interested and/or targeted advertisements for products and/or services for which the user 106 may be interested. The embodiments described herein determine a level of confidence that an identified media item is being presented to the user 106.

Figure 7:
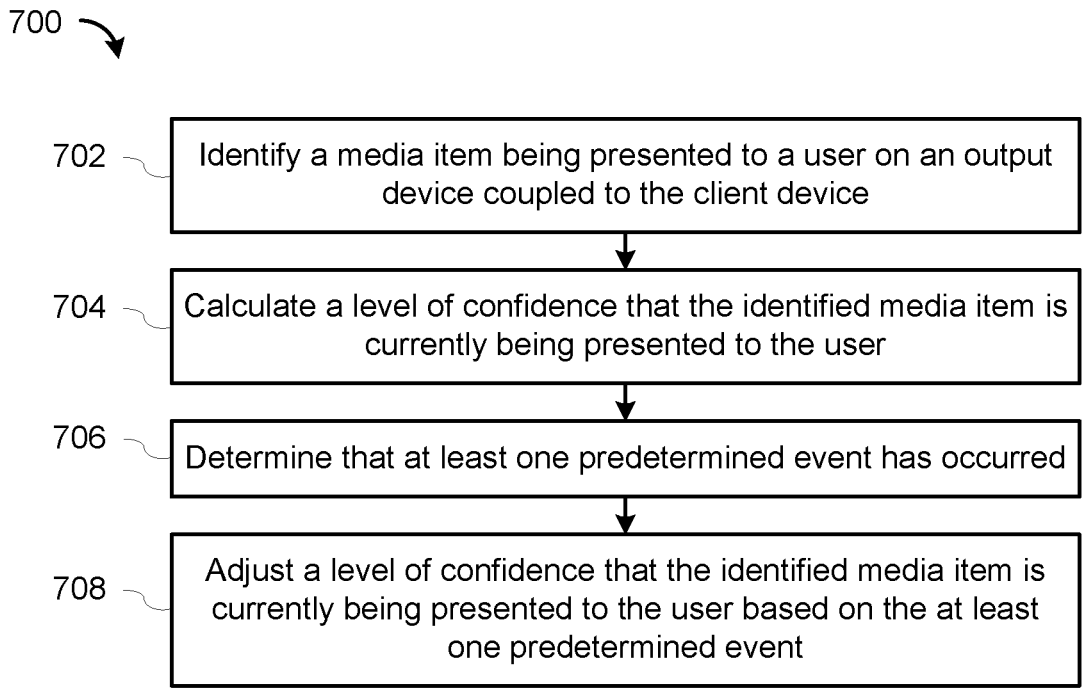
FIG. 7 is a flowchart of a method for determining a level of confidence that an identified media item is currently being presented to a user, according to some embodiments.

FIG. 7 is a flowchart of a method 700 for determining a level of confidence that an identified media item is currently being presented to the user 106, according to some embodiments. In some embodiments, the method 700 is performed by the application framework 301.

The application framework 301 identifies (702) a media item being presented to a user on the output device 102 coupled to the client device 101. As discussed above, the client device 101 includes the input device 105 that is usable by the user 106 of the client device 101 to instruct the client device 101 to acquire and present media items from a plurality of media devices (e.g., the media device 103). Operation 702 is described in more detail below with reference to FIGS. 10-13.

The application framework 301 calculates (704) a level of confidence that the identified media item is currently being presented to the user.

The application framework 301 determines (706) that at least one predetermined event has occurred and adjusts (708) a level of confidence that the identified media item is currently being presented to the user based on the at least one predetermined event. Operations 706 and 708 are described in more detail below.

Adjusting a Level of Confidence that an Identified Media Item is Currently Being Presented When the user 106 uses the input device 105 with a high frequency, it is likely that the user 106 is only using the input device 105 to make requests to and/or issue commands to the media device 103 and the client device 101 has a higher level of confidence that identified media item is being presented to the user 106. Thus, in some embodiments, the at least one predetermined event includes a frequency of input events received from the input device of the client device exceeding predetermined threshold frequency of input events. In these embodiments, the application framework 301 adjusts (708) the level of confidence that the identified media item is currently being presented to the user based on the at least one predetermined event by increasing the level of confidence that the identified media item is currently being presented to the user 106.

When the user 106 uses an input device other than the input device 105, the client device 101 has a lower level of confidence that identified media item is being presented to the user 106. Thus, in some embodiments, the at least one predetermined event includes detecting (e.g., using an IR detector, etc.) that the user is using another input device to acquire media items from the plurality of media devices. The input device includes, but it not limited to, another input device (e.g., a controller for the media device 103) that is not coupled to the client device 101, a button on the media device 103. In these embodiments, the application framework 301 adjusts (708) the level of confidence that the identified media item is currently being presented to the user based on the at least one predetermined event by decreasing the level of confidence that the identified media item is currently being presented to the user 106.

During particular times of the day, the client device 101 may determine that the user 106 historically uses the input device 105 exclusively to send requests and/or commands to the media device 103. Thus, in some embodiments, the at least one predetermined event includes a current time that is in a range of times during which the user 106 uses the input device 105 of the client device 101 to instruct the client device 101 to acquire and present media items from the plurality of media devices. In these embodiments, the application framework 301 adjusts (708) the level of confidence that the identified media item is currently being presented to the user based on the at least one predetermined event by increasing the level of confidence that the identified media item is currently being presented to the user 106.

During particular times of the day, the client device 101 may determine that the user 106 historically uses an input device other than the input device 105 to send requests and/or commands to the media device 103. Thus, in some embodiments, the at least one predetermined event includes a current time that is in a range of times during which the user 106 does not use an input device of the client device to instruct the client device 101 to acquire and present media items from the plurality of media devices. For example, during the 6 am-8 am time period, the user 106 may use a controller for the media device 103 (e.g., a TV remote controller) to control the media device 103. In these embodiments, the application framework 301 adjusts (708) the level of confidence that the identified media item is currently being presented to the user based on the at least one predetermined event by decreasing the level of confidence that the identified media item is currently being presented to the user 106.

When the client device 101 has not seen any input events from the input device 105 for a particular time interval, the client device 101 cannot be sure that the user 106 is still being presented the identified media item. For example, the user 106 may have turned off the output device 102 using a button on the output device 102. Thus, in some embodiments, the at least one predetermined event includes a time period since a most-recent tune-in event exceeding a predetermined time period. In these embodiments, the application framework 301 adjusting (708) the level of confidence that the identified media item is currently being presented to the user 106 based on the at least one predetermined event by decreasing the level of confidence that the identified media item is currently being presented to the user 106.

Figure 8:
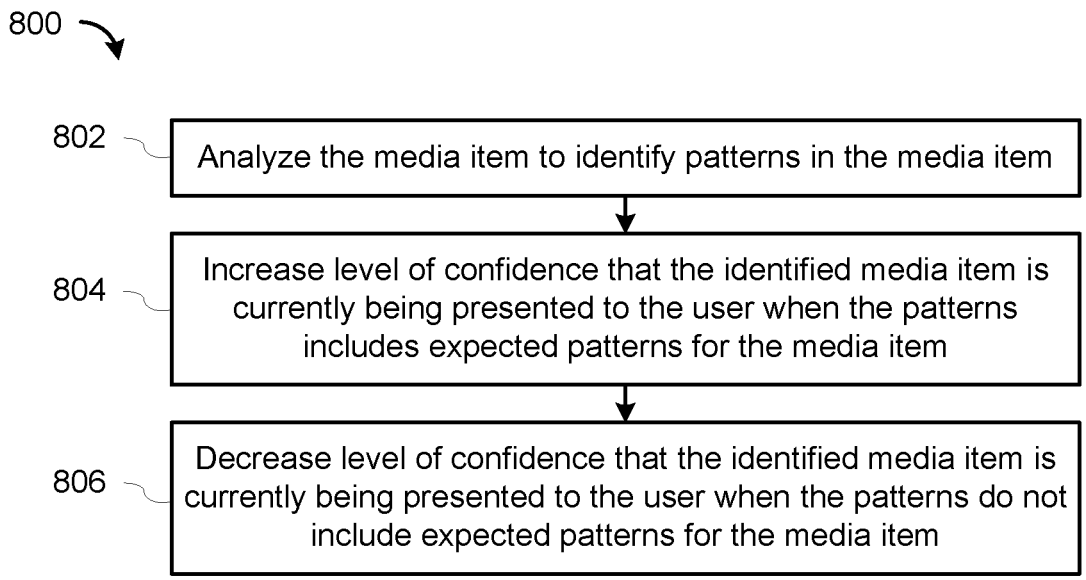
FIG. 8 is a flowchart of a method for adjusting a level of confidence that media item is currently being presented to a user based on patterns identified in the media item, according to some embodiments.

In some implementations, the client device 101 analyzes the media item to identify patterns, which are then used to adjust the level of confidence that the identified media item is currently being presented to the user 106. FIG. 8 is a flowchart of a method 800 for adjusting (708) the level of confidence that media item is currently being presented to the user 106 based on patterns identified in the media item, according to some embodiments. The application framework 301 analyzes (802) the media item to identify patterns in the media item. The application framework 301 increases (804) level of confidence that the identified media item is currently being presented to the user 106 when the patterns includes expected patterns for the media item. The application framework 301 decreases (806) the level of confidence that the identified media item is currently being presented to the user when the patterns do not include expected patterns for the media item. The expected pattern includes, but is not limited to, an audio watermark in an audio signal of the media item, a video watermark in a video signal of the media item, a channel logo in the video signal of the media item, and a credit roll at a particular time index of the media item.

Figure 9:
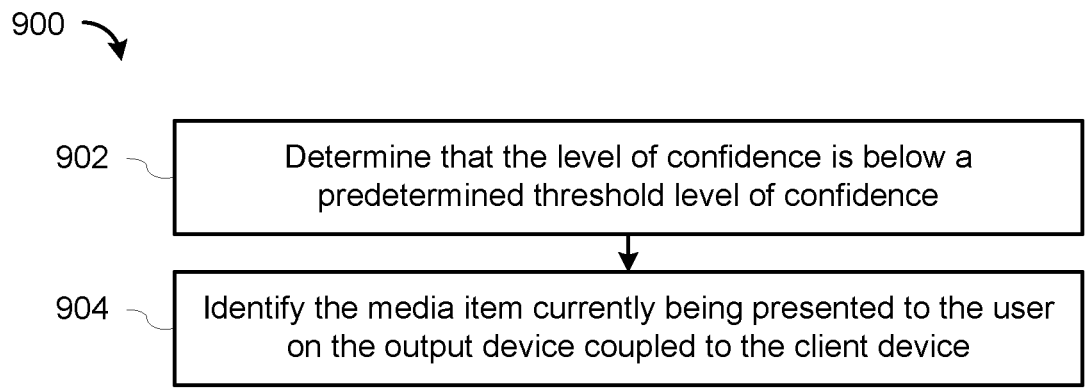
FIG. 9 is a flowchart of a method for re-identifying a media item currently being presented to a user, according to some embodiments.

In some embodiments, when the level of confidence that the identified media item is currently being presented to the user 106 falls below a predetermined threshold level, the application framework 301 re-identifies the media item currently being presented to the user 106. These embodiments are illustrated in FIG. 9, which is a flowchart of a method 900 for re-identifying a media item currently being presented to a user, according to some embodiments. The application framework 301 determines (902) that the level of confidence is below a predetermined threshold level of confidence and identifies (904) the media item currently being presented to the user on the output device 102 coupled to the client device 101.

Identifying a Media Item Being Presented to a User

The following discussion provides several techniques for identifying a media item being presented to a user. These techniques may be used separately or in various combination with each other.

In some embodiments, when identifying the media item being presented to the user on the output device coupled to the client device, the application framework 301 identifies the media item being presented to the user 106 on the output device 102 based on input events (e.g., the input events 310) received from the input device 105 of the client device 101. For example, the input events include, but are not limited to changing a channel on the media device 103, receiving a URL selected by the user 106.

Figure 10:
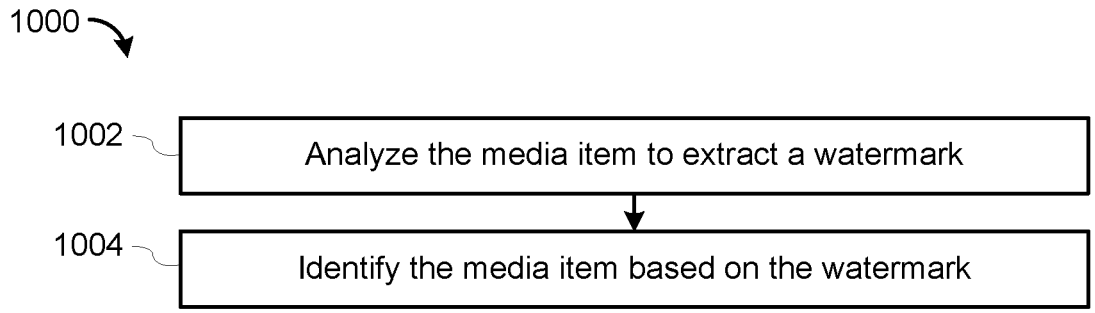
FIG. 10 is a flowchart of a method for identifying a media item being presented to the user, according to some embodiments.

FIG. 10 is a flowchart of a method 1000 for identifying (702) the media item being presented to the user 106, according to some embodiments. The application framework 301 analyzes (1002) the media item to extract a watermark. The application framework 301 identifies the media item based on the watermark. The watermark includes, but is not limited to, an audio watermark and a video watermark.

Figure 11:
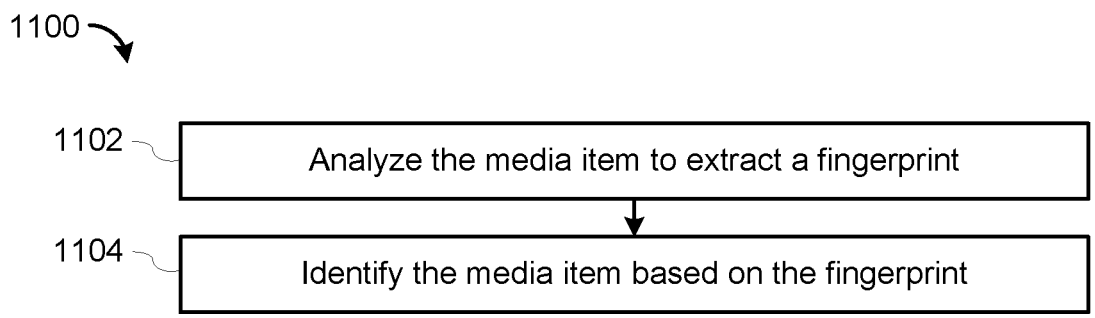
FIG. 11 is a flowchart of another method for identifying a media item being presented to the user, according to some embodiments.

FIG. 11 is a flowchart of a method 1100 for identifying (702) a media item being presented to the user 106, according to some embodiments. The application framework 301 analyzes (1102) the media item to extract a fingerprint and identifies the media item based on the fingerprint. The fingerprint includes, but is not limited to, an audio fingerprint and a video fingerprint.

Figure 12:
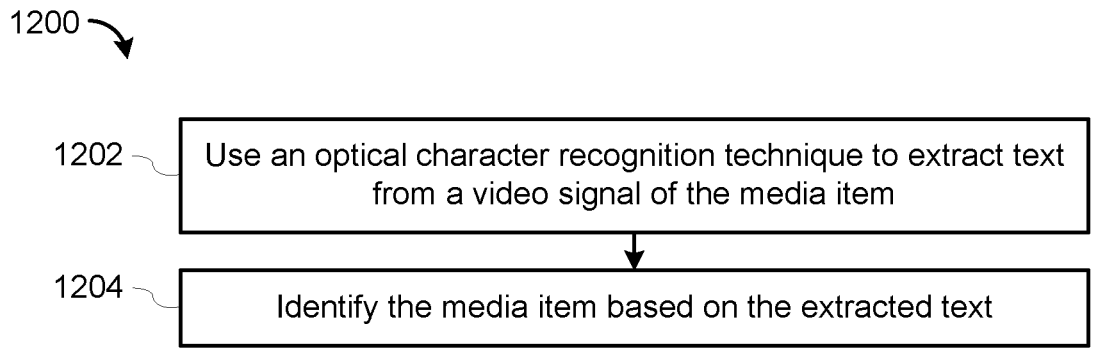
FIG. 12 is a flowchart of another method for identifying a media item being presented to the user, according to some embodiments.

FIG. 12 is a flowchart of a method 1200 for identifying (702) a media item being presented to the user 106, according to some embodiments. The application framework 301 uses (1202) an optical character recognition technique to extract text from a video signal of the media item. For example, the text includes, but is not limited to, text, a channel logo, a channel banner, and closed captioning text. The application framework 301 identifies (1204) the media item based on the extracted text.

Figure 13:
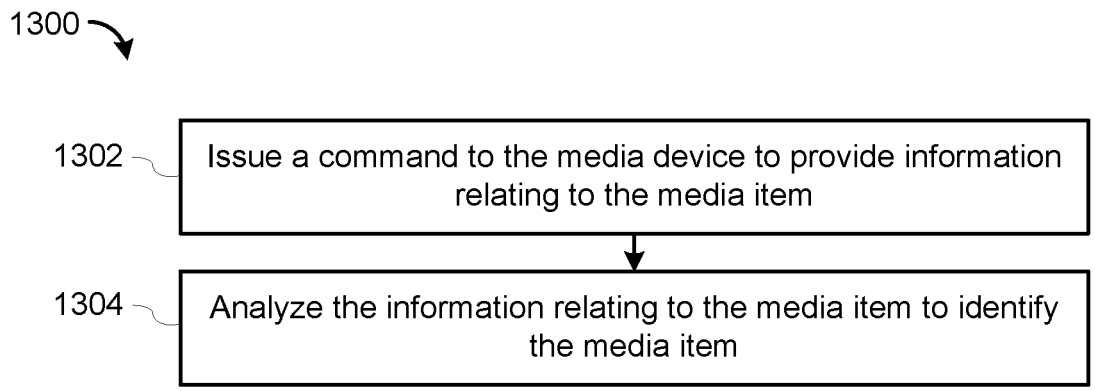
FIG. 13 is a flowchart of another method for identifying a media item being presented to the user, according to some embodiments.

FIG. 13 is a flowchart of a method 1300 for identifying (702) a media item being presented to the user, according to some embodiments. The application framework 301 issues (1302) a command to the media device 102 to provide information relating to the media item. For example, the application framework 301 may issue a command to the media device 103 to bring up an on-screen overlay that includes information relating to the media item. The application framework 301 analyzes (1304) the information relating to the media item to identify the media item. For example, the application framework 301 may use optical character recognition to read text from the on-screen overlay.

Presenting a Media Item to a User

Figure 14:
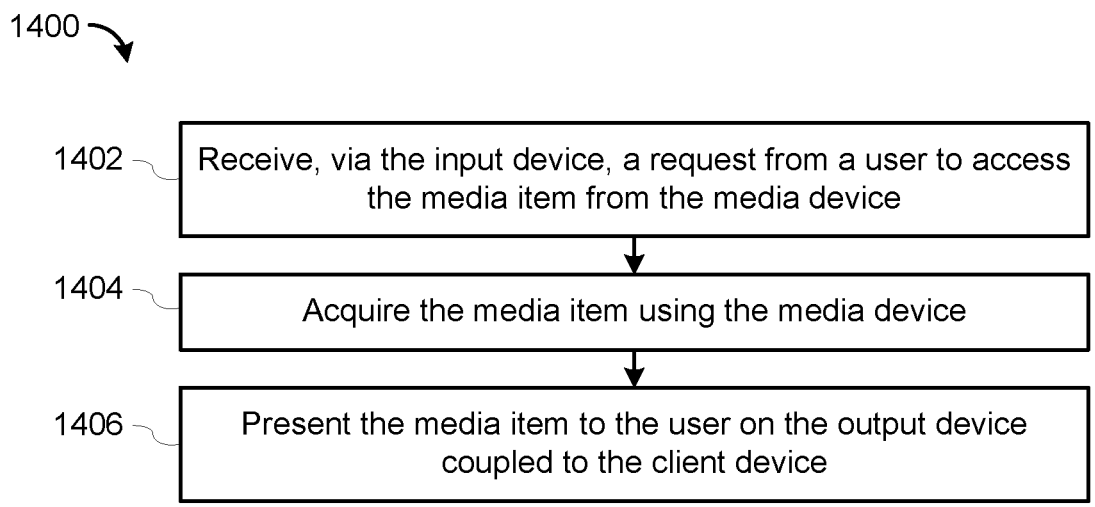
FIG. 14 is a flowchart of a method for presenting a media item requested by a user, according to some embodiments.

FIG. 14 is a flowchart of a method 1400 for presenting a media item requested by the user 106, according to some embodiments. The application framework 301 receives, via the input device 105, a request from the user 106 to access the media item from the media device 103. For example, the request may include a request to change channels. The application framework 301 acquires (1402) the media item using the media device 103 and presents (1406) the media item to the user 106 on the output device 102 coupled to the client device 101.

Other Embodiments

In some embodiments, the client device 101 includes an IR detector that monitors IR signals. When the IR detector detects IR signals that were not produced by the client device 101, the client device 101 extracts an IR code from the IR signal and identifies a user action based on the extracted IR code. Note that the client device 101 may include other types of detectors and/or may monitor other types of control signals (e.g., Bluetooth, IP packets, etc.).

In some embodiments, the client device 101 uses metadata for the media items to determine when the media item is scheduled to end. For example, if the media item is a television program on a television channel, the metadata for the television program may indicate that the television program is scheduled to end in five minutes. In some embodiments, when the presentation of the media the media item within a predetermined time period from the end of the media item, the client device 101 makes recommendations for other media items in which the user 106 may be interested.

In some embodiments, the client device 101 uses information relating to a file size and/or a playing time for a streaming media item to determine a remaining play time of the media item. In some embodiments, when the presentation of the media the media item within a predetermined time period from the end of the media item, the client device 101 makes recommendations for other media items in which the user 106 may be interested.

The client device 101 may use other techniques to determine a remaining amount of time before the media item ends. In some embodiments, the client device 101 detects a credit roll (e.g., a scrolling list of actors, directors, producers, etc.) for a media item and determines that the media item will end shortly. In some embodiments, the client device 101 detects that the output device 102 is presenting predetermined audio signals and/or video signals that signify that the media item will end shortly or has already ended. For example, the client device 101 may detect that the output device 102 is outputting a black screen and determines that the media item has ended.

The methods illustrated in FIGS. 7-14 may be governed by instructions that are stored in a computer readable storage medium and that are executed by one or more processors of one or more servers. Each of the operations shown in FIGS. 7-14 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method for determining a level of confidence that an identified media item is currently being presented to a user, comprising:
at a client device having at least one processor and memory:
identifying a media item being presented on an output device coupled to the client device, wherein the client device includes an input device distinct from the output device;
calculating a level of confidence that the identified media item is currently being presented to the user;
subsequent to the calculating, determining that at least one predetermined event associated with user interaction with the media item has occurred via the input device; and
based on the at least one predetermined event, increasing or decreasing the level of confidence that the identified media item is currently being presented to the user.

2. The method of claim 1, further comprising, in accordance with a determination that the level of confidence exceeds a predetermined confidence threshold, recommending related media to the user.

3. The method of claim 1, further comprising, in accordance with a determination that the level of confidence exceeds a predetermined confidence threshold, updating interest data of the user.

4. The method of claim 1, wherein the at least one predetermined event includes a frequency of input events received from the input device of the client device exceeding predetermined threshold frequency of input events.

5. The method of claim 1, wherein the at least one predetermined event includes detecting that the user is using another input device to acquire media items.

6. The method of claim 1, wherein the at least one predetermined event includes a current time that is in a range of times during which the user uses the input device of the client device to instruct the client device to acquire and present media items.

7. The method of claim 1, wherein the at least one predetermined event includes a current time that is in a range of times during which the user does not use an input device of the client device to instruct the client device to acquire and present media items.

8. The method of claim 1, wherein the at least one predetermined event includes a time period since a most-recent tune-in event exceeding a predetermined time period.

9. The method of claim 1, including:
determining that the level of confidence is below a predetermined threshold level of confidence; and
re-identifying the media item currently being presented to the user on the output device coupled to the client device.

10. The method of claim 1, including:
analyzing the media item to identify patterns in the media item; and
increasing the level of confidence that the identified media item is currently being presented to the user when the patterns includes expected patterns for the media item; and
decreasing the level of confidence that the identified media item is currently being presented to the user when the patterns do not include expected patterns for the media item.

11. The method of claim 10, wherein an expected pattern is selected from the group consisting of:
an audio watermark in an audio signal of the media item;
a video watermark in a video signal of the media item;
a channel logo in the video signal of the media item; and
a credit roll at a particular time index of the media item.

12. The method of claim 1, wherein identifying the media item includes identifying the media item based on input events received from the input device of the client device.

13. The method of claim 1, wherein identifying the media item includes:
analyzing the media item to extract a watermark; and
identifying the media item based on the watermark.

14. The method of claim 1, wherein identifying the media item includes:
using an optical character recognition technique to extract text from a video signal of the media item; and
identifying the media item based on the extracted text.

15. The method of claim 1, wherein identifying the media item includes:
issuing a command to a media device to provide information relating to the media item; and
analyzing the information relating to the media item to identify the media item.

16. The method of claim 1, wherein prior to identifying the media item, the method includes:
receiving, via the input device, a request from a user to access the media item from a media device;
acquiring the media item using the media device; and
presenting the media item to the user on the output device coupled to the client device.

17. The method of claim 1, wherein the media item is selected from the group consisting of:
a movie;
a video;
a television program;
a book;
an issue of a magazine;
an article;
a song; and
a game.

18. The method of claim 1, wherein the client device is a television set top box.

19. A client device, comprising:
at least one processor;
memory; and
at least one program stored in the memory and executable by the at least one processor, the at least one program comprising instructions to:
identifying a media item being presented on an output device coupled to the client device, wherein the client device includes an input device distinct from the output device;
calculating a level of confidence that the identified media item is currently being presented to a user;
subsequent to the calculating, determining that at least one predetermined event associated with user interaction with the media item has occurred via the input device; and
based on the at least one predetermined event, increasing or decreasing the level of confidence that the identified media item is currently being presented to the user.

20. A non-transitory computer-readable storage medium storing at least one program configured for execution by at least one processor of a client device, the at least one program comprising instructions to:

identify a media item being presented on an output device coupled to the client device, wherein the client device includes an input device distinct from the output device;

calculate a level of confidence that the identified media item is currently being presented to a user;

subsequent to the calculating, determine that at least one predetermined event associated with user interaction with the media item has occurred via the input device; and based on the at least one predetermined event, increase or decrease the level of confidence that the identified media item is currently being presented to the user.

* * * * *